(12) United States Patent
Amari et al.

(10) Patent No.: US 10,399,289 B2
(45) Date of Patent: Sep. 3, 2019

(54) DEPOSITION HEAD FOR DEPOSITING AN IMPREGNATED FIBER TAPE, AND A DEVICE FOR PLACING SUCH A TAPE

(71) Applicant: AIRBUS HELICOPTERS, Marignane (FR)

(72) Inventors: Andre Amari, La Chapelle en Serval (FR); Guillaume Dulac, Saint-Brice Sous Foret (FR); Philippe Tardieu, Le Thillay (FR); Jacques Gaffiero, Paris (FR)

(73) Assignee: AIRBUS HELICOPTERS, Marignane (FR)

( * ) Notice: Subject to any disclaimer, the term of this patent is extended or adjusted under 35 U.S.C. 154(b) by 144 days.

(21) Appl. No.: 15/602,513

(22) Filed: May 23, 2017

(65) Prior Publication Data

US 2017/0341315 A1    Nov. 30, 2017

(30) Foreign Application Priority Data

May 24, 2016    (FR) ..................................... 16 00833

(51) Int. Cl.
  *B29C 70/38* (2006.01)
  *B29C 70/54* (2006.01)
  (Continued)

(52) U.S. Cl.
  CPC .......... *B29C 70/388* (2013.01); *B29C 70/545* (2013.01); *B65H 16/005* (2013.01); *B65H 35/0086* (2013.01); *B29L 2007/00* (2013.01)

(58) Field of Classification Search
  CPC ............................. B29C 70/386; B29C 70/388
  See application file for complete search history.

(56) References Cited

U.S. PATENT DOCUMENTS 4,508,584 A * 4/1985 Charles ................. B29C 70/388
                                                                 156/353
4,557,783 A * 12/1985 Grone ................... B29C 70/388
                                                                 156/249
(Continued)

FOREIGN PATENT DOCUMENTS

DE      102012017595          3/2014
DE      102012017595 A1 *     3/2014
(Continued)

OTHER PUBLICATIONS

Machine Translation of DE 102012017595, Date Unknown.*
(Continued)

*Primary Examiner* — Jeffry H Aftergut
(74) *Attorney, Agent, or Firm* — Brooks Kushman P.C.

(57) ABSTRACT

The present invention relates to a deposition head provided with an assemblage comprising a of impregnated fibers arranged against a backing tape. The deposition head includes a slide and a movement actuator connected to the slide to move the slide in translation from a high position to a low position, said slide carrying a peeling roller, said backing tape extending over a circular arc against the peeling roller, said low position being configured so that said peeling roller presses said tape of impregnated fibers against a deposition surface only in the low position of the slide, said circular arc occupying a first angle in the low position of the slide and a second angle in the high position of the slide, said first angle being greater than said second angle.

20 Claims, 6 Drawing Sheets

(51) Int. Cl.
  *B65H 16/00* (2006.01)
  *B65H 35/00* (2006.01)
  *B29L 7/00* (2006.01)

(56) References Cited

U.S. PATENT DOCUMENTS

| | | | |
|---|---|---|---|
| 5,110,395 A | 5/1992 | Vaniglia | |
| 5,480,508 A * | 1/1996 | Manabe | B26D 3/08 |
| | | | 156/353 |
| 6,540,000 B1 | 4/2003 | Darrieux et al. | |
| 2010/0139865 A1* | 6/2010 | Tillement | B29C 70/388 |
| | | | 156/349 |
| 2012/0325398 A1* | 12/2012 | Silcock | B29C 70/386 |
| | | | 156/176 |
| 2016/0243769 A1 | 8/2016 | Shibutani et al. | |

FOREIGN PATENT DOCUMENTS

| | | |
|---|---|---|
| EP | 0144927 A2 | 6/1985 |
| EP | 0144927 A3 | 6/1985 |
| FR | 2507959 A1 | 12/1982 |
| FR | 2785623 | 5/2000 |
| FR | 2982792 | 5/2013 |
| GB | 2101519 A | 1/1983 |
| GB | 2492594 | 1/2013 |
| WO | 0196223 | 12/2001 |
| WO | 2015068734 | 5/2015 |

OTHER PUBLICATIONS

Korean Notice of Preliminary Rejection dated Apr. 12, 2018, Application No. 10-2017-0063870, Applicant Airbus Helicopters, 4 Pages.
French Search Report for French Application No. FR 1600833, Completed by the French Patent Office dated Feb. 10, 2017, 14 Pages.
European Search Report for European Application No. EP 17 17 1444, Completed by the European Patent Office on Oct. 6, 2017, 18 Pages.
European Search Report for European Application No. EP 17 17 1444, Completed by the European Patent Office dated Feb. 12, 2018, 16 Pages.

* cited by examiner

DEPOSITION HEAD FOR DEPOSITING AN IMPREGNATED FIBER TAPE, AND A DEVICE FOR PLACING SUCH A TAPE

CROSS-REFERENCE TO RELATED APPLICATIONS

This application claims priority to European patent application No. FR 16 00833 filed on May 24, 2016, the disclosure of which is incorporated in its entirety by reference herein.

BACKGROUND OF THE INVENTION (1) Field of the Invention

The present invention relates to a deposition head for depositing an impregnated fiber tape, and to a device for placing such a tape. The invention is thus situated in the technical field of fabricating parts out of composite materials by using the fiber placement method to place an impregnated fiber tape.

(2) Description of Related Art

The fiber placement method is a method that is an alternative to winding a continuous filament.

Fiber placement is a method of depositing fibers, tapes, roving, or other similar kinds of reinforcement, whether dry or preimpregnated with resin, onto surfaces of various shapes. Such placement is performed by using a device having a movable deposition head. The deposition head thus serves to position the material used on a surface by direct mechanical contact with that surface. For this purpose, the deposition head is driven by a drive system such as a robot arm or a positioning gantry, having its degrees of freedom servo-controlled to match the shape of the surface of the body for covering.

The fiber placement method thus serves in particular to make surfaces of large dimensions and small thicknesses, within the limits of the size of the deposition head.

In particular, the fiber placement method makes it possible to perform tape deposition sequences automatically. Each sequence includes operations of approaching, deposition, and cutting.

Placing a fiber tape on a part by means of a placement device can be difficult. Specifically, the material in tape form that is deposited by a placement device tends to be tacky.

It should be recalled that tack is a state of a "sticky" surface, i.e. a surface that has the property of adhering to itself or to some other body merely by making contact. In particular, a fiber tape impregnated with a matrix may be impregnated by a wet technique. By way of example, this impregnation technique consists in impregnating carbon or glass or indeed basalt fibers by dipping them in a resin in the liquid state.

Another technique consists in diluting a viscous resin in a solvent and then in evaporating the solvent after impregnating the fibers. This technique is referred to as the solvent technique or impregnation by dissolving.

At ambient temperature, tapes having fibers that have previously been impregnated by the wet technique generally present tack that is higher than the tack of tapes that have previously been impregnated by the solvent technique. Such low tack of tapes of fibers that have previously been impregnated by the solvent technique is associated with greater stiffness that also provides the fiber tape with greater stability. The fiber tape is thus less "sticky" and more "rigid" at ambient temperature than a tape of fibers impregnated by the wet technique.

Fiber tapes presenting high tack tend to adhere to the guide, peeling, and drive surfaces of placement devices, and indeed tend to clog such placement devices.

Thus, the fiber tapes used for making parts by fiber placement are advantageously impregnated using the solvent technique, since such fiber tapes impregnated by the solvent technique are easier to convey and to guide, and they make it easier to superpose plies on one another. Such fiber tapes impregnated by the solvent technique also limit the transfer of resin onto the placement device, thereby serving to reduce the risk of breakdown by clogging and to reduce the operations needed for cleaning the placement device.

In contrast, such fiber tapes impregnated by the solvent technique are available on the market at costs that are significantly higher than fiber tapes impregnated by the wet technique.

Furthermore, a fiber placement sequence comprises in succession an approach stage, a deposition stage, and a cutting stage.

During the approach stage, the fiber tape is taken towards the deposition surface. During the deposition stage, the fiber tape is deposited on the deposition surface. Finally, during the cutting stage, the fiber tape is cut.

A deposition head thus usually includes a cutter system. By way of example, a cutter system may be constituted by a pneumatic guillotine driving a metal blade in order to cut the fiber tape. Because of the size of the cutter system, a considerable transition distance lies between the plane in which the fiber tape is cut and the plane where the fiber tape is deposited on the deposition surface. During the approach stage, the fiber tape thus needs to be moved along this transition distance, which can be difficult, in particular with fiber tapes that have been impregnated by the wet technique and that are floppy.

Document WO 01/96223 describes a deposition head for depositing tows of fibers arranged on a storage spool. The deposition head includes a motor-driven wheel driving fiber tows towards compacting means via guide rollers. At the outlet from the compacting means, the fiber tows are directed towards a deposition roller. Cutter means are interposed between the compacting means and the deposition roller.

Document GB 2 492 594 describes a deposition head. That deposition head comprises a first storage spool having wound thereon a backing tape with resin adhered thereto. The deposition head has a second storage spool with a fiber tape wound thereon. The fiber tape comes into contact with the resin and the backing tape on passing through a device comprising a heater roller and an adhesion roller. Under such circumstances, the assemblage comprising the backing tape, the fiber tape, and the resin passes between a deposition roller and a peeling shoe. The backing tape passes around the peeling shoe in order to be separated from the resin, while, on the contrary, the resin together with the fiber tape are deposited on the deposition surface. A compression shoe then compresses the fiber tape and the resin against the deposition surface.

That solution makes use of a backing tape. In general manner, it can be difficult to peel off a backing tape. Specifically, fibers of the fiber tape can remain attached to the backing tape under certain conditions.

Document U.S. Pat. No. 5,110,395 describes a fiber deposition head for a fiber placement machine. Tows that are individually impregnated with resin and referred to as "towpregs" are brought at independent speeds from a creel assembly in order to apply fiber bands on a deposition surface.

The deposition head includes an applicator in the form of a shoe or a roller for applying the tape against the deposition surface.

Documents U.S. Pat. No. 6,540,000 and FR 2 785 623 disclose a device having spools containing tapes. The tapes are brought together by deflector pulleys so as to form a sheet made up of a plurality of juxtaposed tapes that pass through brake means in order to reach a deposition roller. The break means comprise two jaws driven by an actuator, with the sheet traveling between the two jaws.

The deflector pulleys, the break means, and the deposition roller are arranged on a plate that can be moved in elevation.

The plate also carries a blade suitable for rotating in order to cut the sheet against an ultrasonically vibrating anvil of the deposition head.

The deposition head does not make use of a backing tape that ends up needing to be peeled off.

Document FR 2 982 792 describes a deposition head for depositing a tape of impregnated fibers that is provided with a spool carrying an assemblage of tapes including the tape of impregnated fibers arranged on a separator tape. The deposition head includes a spool for recovering the separator tape together with parting means for parting the tape of impregnated fibers from the separator tape. The deposition head includes a smoother having a sharp or rounded edge and arranged after the parting means in the travel direction of the tape of impregnated fibers, the tape of impregnated fibers coming into contact solely with said edge.

Documents U.S. Pat. No. 5,480,508, DE 10 2012 017595, WO 2015/068734, and EP 0 144 927 are also known.

Document U.S. Pat. No. 5,480,508 discloses a deposition head having a vertically movable peeling roller.

BRIEF SUMMARY OF THE INVENTION

An object of the present invention is thus to propose a deposition head for depositing tapes of impregnated fibers on a deposition surface. By way of example, such a deposition surface may be a mold, a mandrel, or indeed a tape of fibers previously deposited on a surface.

The invention thus provides a deposition head for depositing a tape of impregnated fibers. The deposition head is provided with a tape assemblage comprising the tape of impregnated fibers arranged on a backing tape, the deposition head including a recovery spool for recovering the backing tape and parting means for parting the tape of impregnated fibers from the backing tape.

The deposition head includes a slide and a movement actuator connected to the slide to move the slide in translation from a high position to a low position, the slide carrying a peeling roller of the parting means, the backing tape extending over a circular arc against the peeling roller in order to reach the recovery spool, the low position being configured so that the peeling roller presses the tape of impregnated fibers against a deposition surface only in the low position of the slide, the circular arc occupying a first angle in the low position of the slide and a second angle in the high position of the slide, the first angle being greater than the second angle.

The term "peeling roller" designates a member that is free to rotate relative to the slide. In particular, the roller may be in the form of a wheel, of a cylinder, or even in the form of a hemispherical member known as a "conch drum".

The term "the deposition head is provided with an assemblage comprising the tape of impregnated fibers arranged on a backing tape" means that the deposition head carries such an assemblage. This assemblage may come from one or more spools carried by the deposition head, or indeed located off the deposition head.

The term "movement actuator" designates an actuator suitable for moving the slide in translation, e.g. a hydraulic or pneumatic actuator, possibly arranged in a cavity in the slide, or indeed an electrical actuator, for example.

The invention thus makes provision for providing the deposition head with help from a mechanical support that is guided to move in translation and that is referred to as a "slide". The slide may be referred to as an approaching and peeling slide because of the functions it performs.

In particular, the slide is movable to start a sequence of depositing the tape of impregnated fibers.

The slide is moved from the high position towards the low position in order to bring the tape of impregnated fibers against the deposition surface. Consequently, it is possible to use a tape of impregnated fibers that is floppy.

Furthermore, the slide carries the peeling roller that serves to separate the tape of impregnated fibers from the backing tape, in a particular configuration that is capable of ensuring good quality for the deposition operation, in particular by limiting any risk of decohesion of the fibers of the tape of impregnated fibers as a result of fibers breaking and adhering in part to the backing tape.

Under such circumstances, the deposition head makes it possible to deposit on a deposition surface a material that is in the form of a tape of impregnated fibers. By way of example, such a tape may have a width lying in the range 20 millimeters (mm) to 90 mm. Also, the fibers of the tape of impregnated fibers may be fibers of carbon, basalt, glass, . . . . In addition, the fibers may be impregnated by the wet technique or by the solvent technique.

By way of example, the backing tape may be a film of plastics material of the polyurethane or polyethylene type. The backing tape provides the spool of material with stability during handling and storage operations, and also ensures that unwinding takes place directly without the fibers blocking or tangling. During the deposition operation, the backing tape facilitates guiding and driving the tape of impregnated fibers as it travels through the deposition head by limiting any transfers of resin onto mechanical parts of the deposition head.

So long as the tape of impregnated fibers is in contact with the backing tape, the backing tape is advantageously interposed between the tape of impregnated fibers and the mechanical parts of the deposition head.

The tape of impregnated fibers is separated from the backing tape during a peeling operation.

The peeling operation consists in causing the tape of impregnated fibers to follow a path that is different from the path followed by the backing tape. In order specifically to keep control over the point where the backing tape separates from the tape of impregnated fibers, the peeling roller is tangential to the path followed by the assemblage comprising the tape of impregnated fibers and the backing tape. The peeling roller causes the backing tape leaving the peeling roller to follow a direction that is different from the direction followed by the tape of impregnated fibers, as a result of traction being applied in different orientations to the ends of each of the strands involved.

Under such circumstances, the backing tape travels jointly with the tape of impregnated fibers as far as the peeling roller, and is then discharged towards the recovery spool. Conversely, the tape of impregnated fibers can continue along its path to the deposition surface.

An operation of peeling off the backing tape can lead to fibers of the tape of impregnated fibers being torn away so that they remain stuck to the backing tape after the peeling operation. Specifically, because some resin is transferred to the backing tape, the backing tape presents an adhesive nature and can therefore retain fibers of the tape of impregnated fibers during peeling. In the long run, tearing off fibers in this way can lead to complete degradation of the tape of impregnated fibers.

The invention serves to optimize this peeling operation. Specifically, the backing tape describes a circular arc against the peeling roller, which arc varies as a function of the position of the slide. The variation in the size of the circular arc serves to optimize peeling as a function of the travel speed of the deposition head, and thus of the assemblage of tapes.

In order to avoid tearing off fibers, the angle of the circular arc described by the backing tape against the peeling roller must not exceed a certain value. The value of this angle diminishes with increasing peeling speed, and thus with increasing advance of the deposition head. The term "angle of the circular arc" represents an angle subtended at the center by this circular arc.

For example, if the angle of the circular arc described by the backing tape around the peeling roller is of the order of 180°, then the travel speed may be limited to a low speed value, e.g. of the order of less than 0.15 meters per second (m/s) for a peeling roller having a radius of one to two centimeters (cm).

Conversely, and with such a peeling roller, if the angle of the circular arc described by the backing tape around the peeling roller is of the order of 60°, the travel speed may reach a high speed, e.g. of the order of 2 m/s.

Thus, the second angle may be smaller than or equal to 60°±5°.

In contrast, the first angle may be greater than or equal to 90°, and in particular it may be equal to 180°.

Also, the length between the backing tape at the outlet from the peeling roller and another wheel of the deposition head is also advantageously greater than or equal to 10 cm in order to enhance the peeling operation.

Consequently, the movable slide can start a sequence of depositing the tape of impregnated fibers by being moved into the low position. In this position, the deposition head may be moved slowly to unwind the assemblage of tapes and deposit the tape of impregnated fibers on the deposition surface.

Furthermore, the movable slide enables the travel speed of the deposition head to be increased by being moved into the high position. The arrangement of the slide makes it possible, during the deposition stage, to obtain a geometrical configuration that enables the backing tape to be peeled off at high speed without degrading the tape of impregnated fibers.

Optionally, the slide may also be positioned in an intermediate position lying between the low position and the high position in order to facilitate a cutting step.

The deposition head may also include one or more of the following characteristics.

Thus, the parting means may include at least one intermediate roller arranged between the peeling roller and the recovery spool relative to the path followed by the backing tape going towards the recovery spool.

Each intermediate roller may guide the backing tape towards the recovery spool.

Said at least one intermediate roller may comprise a first intermediate roller and a second intermediate roller, the first intermediate roller being arranged between the second intermediate roller and the recovery spool, with the second intermediate roller leading to an opening in a cutter system.

The term "leading to an opening" means that a tape in contact with the second intermediate roller passes through the opening without touching the edges of the opening.

The second intermediate roller than avoids the backing tape coming into destructive contact with the cutter system while the slide is in its low position. The first intermediate roller determines the value of the second angle and ensures it is stable for the peeling operation in the high position.

In another aspect, the peeling roller may be arranged at one end of the slide.

The slide extends lengthwise between two ends. In particular, the peeling roller is carried by the end of the slide that is closer to the deposition surface. Under such circumstances, the peeling roller can easily exert pressure on the tape of impregnated fibers when the slide is in the low position.

In another aspect, the slide may carry a clamp that is movable relative to the slide, a clamping actuator being connected to the clamp to move the clamp from a clamping position to a release position, the clamp in the clamping position constraining the tape of impregnated fibers to move in translation with the slide, the clamp in the release position not constraining the tape of impregnated fibers to move in translation with the slide.

The term "clamping actuator" designates an actuator suitable for moving the clamp in pivoting. By way of example, the clamping actuator may comprise a hydraulic actuator, a pneumatic actuator, or indeed an electrical actuator.

The slide is provided with an incorporated mechanical clamp so as to block the tape of impregnated fibers against a surface of the slide that is especially arranged for this function, in particular during the stage in which the slide is moving in translation from the high position to the low position.

Thus, while starting a deposition sequence, the clamp constrains the tape of impregnated fibers to move in translation with the slide. The slide can thus bring the tape of impregnated fibers correctly to the deposition surface.

The surface on the slide that is arranged for clamping the tape may for example be plane, smooth, and coated in a nonstick coating such as a coating of Teflon®.

When the slide reaches the low position, the clamp then releases the tape of impregnated fibers in order to allow the deposition head to move.

Optionally, the clamp may include a clamping surface parallel to a bearing surface of the slide in the clamping position.

This device serves to optimize the blocking of the tape of impregnated fibers against the bearing surface of the slide.

The clamp may be movable in pivoting about a clamping axis parallel to the axis of rotation of the peeling roller.

This characteristic makes it easy to move the clamp.

Alternatively, the clamp is movable in translation, being driven by an actuator and an appropriate linkage.

In another aspect, the slide may be movable in pivoting about a disengagement axis parallel to an axis of rotation of the peeling roller.

Optionally, a disengagement actuator is connected to the slide to cause the slide to pivot about the disengagement axis.

The term "disengagement actuator" designates an actuator suitable for causing the slide to pivot. By way of example, the disengagement actuator may comprise a hydraulic actuator, a pneumatic actuator, or indeed an electrical actuator.

In order to ensure that the tape of impregnated fibers is pressed against the deposition surface, the slide is fastened to the frame of the deposition head via a pivot hinge parallel to the axis of rotation of the peeling roller. This pivot hinge thus enables the slide to pivot angularly, which leads to the peeling roller at the end of the slide moving substantially vertically, thereby enabling the tape of impregnated fibers to be pressed against the deposition surface. The disengagement actuator arranged between the slide and the pivot serves to apply the pressing force.

In another aspect, the slide may carry a heater system. In order to optimize conditions for peeling off the backing tape, the slide may be fitted with a heater system that is regulated and installed in the body of the slide close to the peeling roller. For example, the heater system may include an electrical heater resistance.

In another aspect, the deposition head may include a cutter system configured to cut the tape of impregnated fibers, the cutter system including an opening through which the peeling roller passes during the movement of the slide between the low position and the high position.

The cutter system serves to cut a tape of impregnated fibers at the end of a deposition sequence.

For example, the cutter system presents a cutting plane and a blade driven by a pneumatic actuator in order to cut the tape of impregnated fibers. The opening in the cutter system allows the slide to pass between the blade and the cutting plane.

In another aspect, the deposition head may include presser means arranged, in the low position of the slide, upstream from the peeling roller relative to the travel direction of the deposition head while depositing the tape of impregnated fibers on the deposition surface.

The presser means may include a roller or indeed a smoother having an edge that is sharp or grounded.

For example, it is possible to envisage using a smoother of the type described in document FR 2 982 792.

Furthermore, the presser means are connected to a compression actuator to be movable between a rest position and a compression position, the rest position being configured so that the presser means do not press the tape of impregnated fibers against the deposition surface, said compression position being configured so that the presser means press the tape of impregnated fibers against the deposition surface.

For example, the presser means are positioned in the rest position while the slide is moving in translation from the low position to the high position. Thereafter, the presser means are lowered into the compression position in order to press against the segment of the tape of impregnated fibers that is deposited on the deposition surface.

The invention also provides a placement device for placing a tape of impregnated fibers. The placement device is provided with a deposition head of the invention, a movement system suitable for moving the deposition head, and control means for controlling the movement system.

Furthermore, the invention provides a placement method for placing a tape of impregnated fibers by means of such a placement device.

The method comprises the following steps:

approaching the deposition head by moving the slide into the low position in order to present at the tape of impregnated fibers against the deposition surface of the peeling roller;

optionally lowering presser means into a compression position and applying smoothing pressure, the smoothing pressure being a predetermined pressure;

moving the deposition head at a first speed;

stopping the deposition head;

moving the slide into the high position; and moving the deposition head at a second speed greater than the first speed.

During the approach stage, the slide thus moves down towards its low position in order to position the tape of impregnated fibers against the deposition surface. The angle through which the backing tape is wound around the peeling roller is maximized, e.g. being of the order of 180°.

Under such circumstances, the movement system moves the deposition head at a low speed, e.g. of 0.1 m/s, over a short distance, e.g. of the order of 7 cm to 10 cm in order to provide an attachment area between the tape of impregnated fibers and the deposition surface.

During the stage of fast deposition, the slide then rises towards its high position. The angle through which the backing tape is wound around the peeling roller is minimized, e.g. being of the order of 60°. The movement system can then move the deposition head at high speed, e.g. at 1 m/s.

Optionally, the step of approaching the deposition head may comprise the following steps:

holding the tape of impregnated fibers against moving in translation relative to the slide;

moving the slide into the low position; and parting the tape of impregnated fibers to move in translation relative to the slide.

During the approach stage, the clamp holds the tape of impregnated fibers against the slide. The slide thus moves down towards its low position in order to position the tape of impregnated fibers against the deposition surface. The angle through which the backing tape is wound around the peeling roller is maximized, e.g. being of the order of 180°.

Under such circumstances, the clamp is opened. The movement system can then move the deposition head at a slow speed. Furthermore, prior to moving the deposition head, the method may include a step of moving the presser means pressing the tape of impregnated fibers against the deposition surface.

Optionally, the method may include a stage of cutting the tape of impregnated fibers.

Advantageously, the backing tape is in contrast not cut, in particular in order to ensure that approaching can take place again after cutting.

During this cutting stage, the slide is moved into an intermediate position in order to be arranged as close as possible to the cutter system. The slide is moved in translation in order to position the peeling roller at a predetermined position from the cutting plane. Where appropriate, the clamp is closed. The cutter system then cuts the tape of impregnated fibers.

During a transfer stage that is performed between two deposition sequences, the slide may remain in the intermediate position.

BRIEF DESCRIPTION OF THE DRAWINGS

The invention and its advantages appear in greater detail in the context of the following description of embodiments given by way of illustration and with reference to the accompanying figures, in which.

Elements that are present in more than one of the figures are given the same references in each of them.

DETAILED DESCRIPTION OF THE INVENTION

Figure 1:
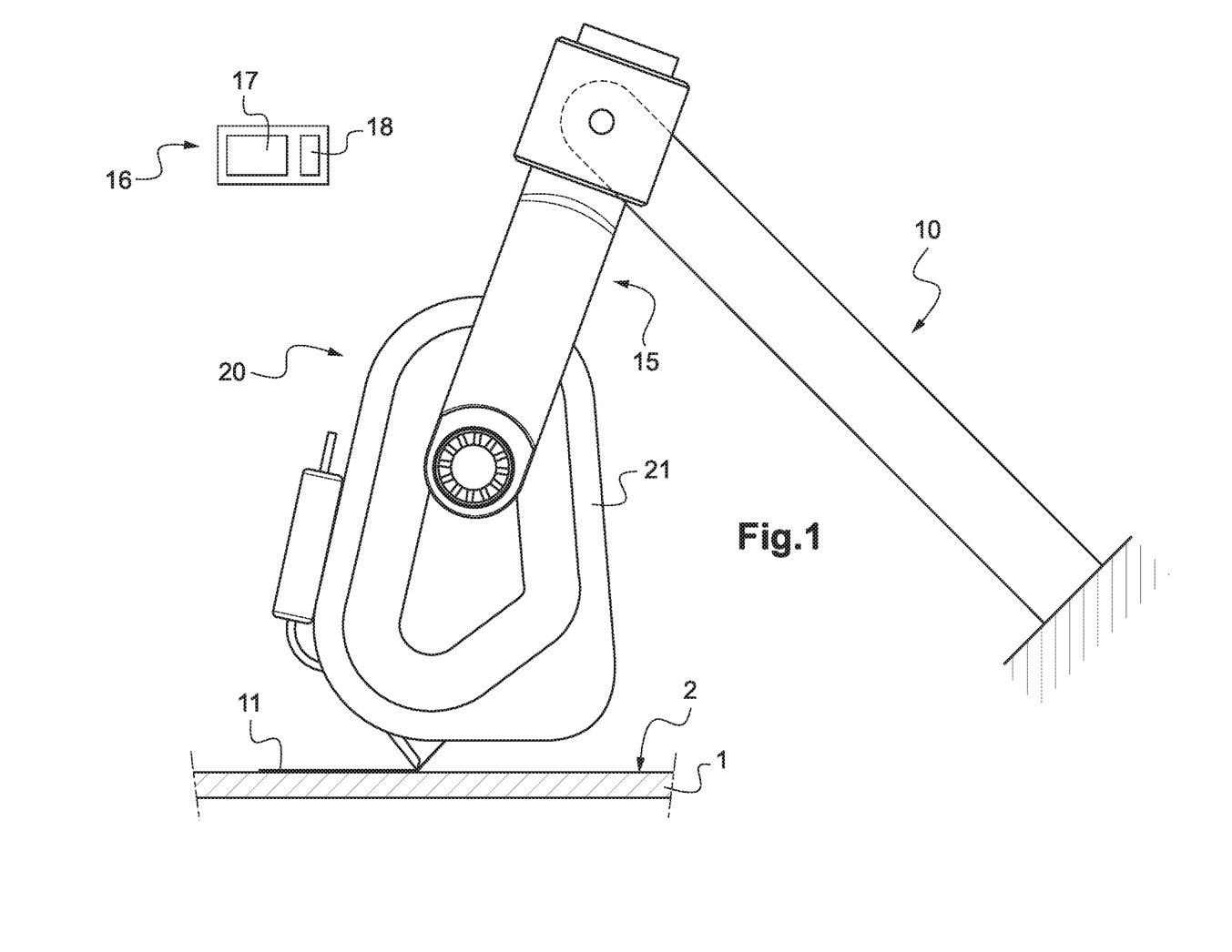
FIG. 1 is a view of a placement device of the invention.

FIG. 1 shows a placement device 10 for placing fibers on a deposition surface 2, such as a surface of a mold 1.

More particularly, the device 10 serves to place a tape 11 of impregnated fibers on the deposition surface 2. The tape 11 of impregnated fibers may comprise fibers impregnated with a resin by the wet technique, e.g. in order to present large capacity for adhesion on a support. The tape 11 of impregnated fibers is then a tacky tape presenting a high degree of tack. Nevertheless, the tape 11 of impregnated fibers could comprise fibers impregnated with resin by the solvent technique.

The device 10 includes a deposition head 20 and a movement system 15 for moving the deposition head in three dimensions. The deposition head 20 comprises a frame 21 carried by the movement system 15. The movement system 15 may be a robot having articulated arms, or it may be a gantry suitable for moving the placement head in a plurality of directions.

Furthermore, the device 10 includes control means 16 for controlling the deposition head 20 and the movement system 15.

The control means may be provided with a visual interface 17 and with man/machine interfaces 18 that can be operated manually by an operator in order to set the parameters for controlling the device 10. For example, these parameters relate in particular to the movement of the deposition head 20, to possible cutting of the tape 11 of impregnated fibers, to a temperature that exists inside the deposition head, and to any other parameter that is useful for the operation of the device 10.

Figure 2:
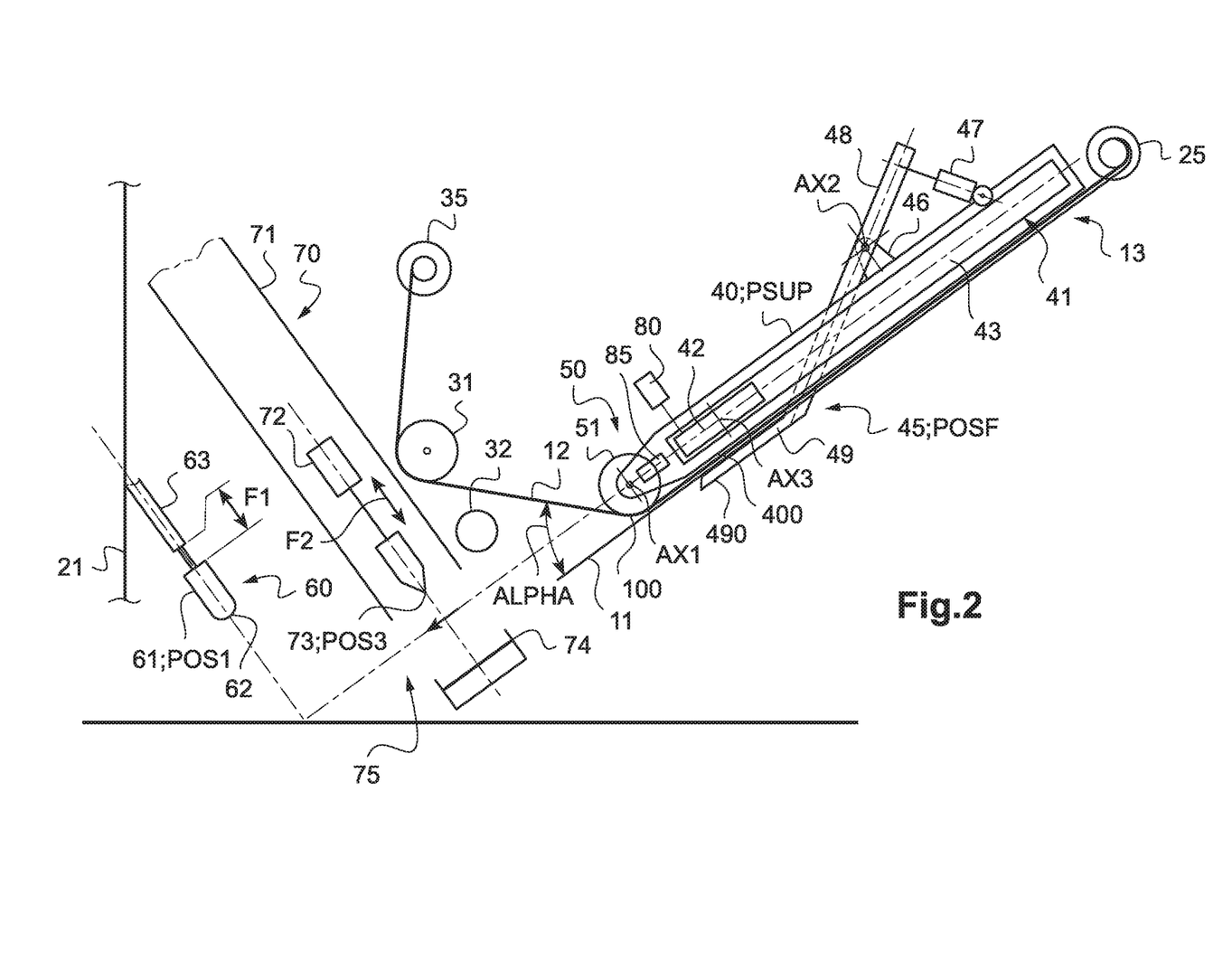
FIG. 2 is a diagram showing a deposition head of the invention.

FIG. 2 shows a diagram of an embodiment of the deposition head 20.

This deposition head comprises an assemblage 13 of tapes traveling through the frame 21. This assemblage 13 of tapes comprises a tape 11 of impregnated fibers superposed against a backing tape 12. The assemblage 13 may be stored in a feed system including in particular a feed spool, and possibly also a deflector roller. Thus, the assemblage 13 is wound around a core of a feed spool 25 referred to as the "feed core". The feed spool maybe housed in the deposition head 20, or outside the deposition head 20.

Where appropriate, a deflector roller is arranged so as to ensure that the path followed by the assemblage 13 is indeed parallel to a bearing surface of the slide as described below, in spite of the diameter of the feed spool 25 varying while unwinding the assemblage 13 of tapes.

The backing tape 12 serves in particular to separate two successive layers of the tape 11 of impregnated fibers, e.g. to allow the tape 11 of impregnated fibers to be unwound from the feed spool 25.

At the outlet from the feed spool 25, the assemblage 13 of tapes runs tangentially over a bearing surface 400 of a slide 40. The slide 40 extends longitudinally from a high end towards a low end. The slide 40 carries a peeling roller 51 of parting means 50. For example, the peeling roller is free to rotate relative to the slide 40 about an axis of rotation AX1. The peeling roller 51 can thus be arranged around a rod secured to the low end of the slide, the rod extending along the axis of rotation AX1. In the proximity of the peeling roller 51, the slide may include a heater system 85, e.g. such as a system having a heater resistor.

The assemblage 13 can follow a straight-line path along the slide 40.

Optionally, the backing tape 12 is interposed between the tape 11 of impregnated fibers and the slide 40.

When the assemblage 13 of tapes reaches the peeling roller 51, the backing tape is directed towards a recovery spool 35, being pressed against a circular arc of the peeling roller 51.

Optionally, at least one intermediate roller 31, 32 guides the backing tape 12 to the recovery spool 35. Each intermediate roller 31, 32 is then interposed between the peeling roller 51 and said recovery spool 35 along the path followed by the backing tape 12 on going towards the recovery spool 35.

For example, a first intermediate roller 31 and a second intermediate roller 32 are provided. The first intermediate roller 31 is arranged functionally between the second intermediate roller 32 and the recovery spool 35. The second intermediate roller 32 is arranged in the proximity of an opening of the cutter system as described below so as to avoid the backing tape 12 coming into destructive contact with the cutter system 3 when the slide is in its low position PINF.

Thus, by way of example, the backing tape 12 may pass permanently against the first intermediate roller 31, and under certain conditions, it may pass optionally against the second intermediate roller 32 arranged between the first intermediate roller 31 and the peeling roller 51. In particular, the tape passes against the second intermediate roller when the slide is not in its high position PSUP.

Conversely, the tape 11 of impregnated fibers does not turn about the second intermediate roller in order to go to the recovery spool 35 when the slide is in the high position.

Consequently, the parting means 50 comprise a peeling roller 51 guiding the backing tape 12 towards a recovery spool 35 while having no influence on the path followed by the tape 11 of impregnated fibers. In order to reach the recovery spool 35, the backing tape 12 needs to change direction so as to present an angle alpha with the tape 11 of impregnated fibers. Under such circumstances, the backing tape 12 separates from the tape 11 of impregnated fibers.

In a variant, an additional tape is wound around an additional spool and is also interposed between firstly the backing tape 12 and secondly the slide 40 together with the parting means 50. For example, the additional spool is placed between the feed spool 25 and the slide 40 relative to the movement of the assemblage 13 of tapes. The additional tape together with the backing tape 12 and the tape 11 of impregnated fibers are directed jointly towards the slide 40, with the additional tape and the backing tape subsequently being guided towards the recovery spool 35.

Specifically, within the feed spool 25, a layer of backing tape 12 is arranged between two layers of the tape 11 of impregnated fibers. Conventionally, backing tapes are made of a material that avoids adhering strongly to the impregnated fibers, such as silicone paper or a structured plastics film, for example. Nevertheless, the face of the backing tape in contact with the members of the deposition head may conserve traces of being wound around the feed core, and consequently traces of resin. The additional tape is then used to avoid clogging the deposition head.

Unlike the backing tape and the additional tape, if any, the tape 11 of impregnated fibers is not deflected, and it continues along its path towards the deposition surface 2 on which this tape 11 of impregnated fibers is to be deposited.

The tape 11 of impregnated fibers is then directed towards transfer means 61, the presser means 61 being arranged downstream from the peeling roller 51 relative to the travel direction of the tape of impregnated fibers through the frame 21 of the deposition head. Under such circumstances, the presser means 61 come into contact neither with the backing tape 12 nor with the additional tape, if any.

By way of example, the presser means 61 may comprise a presser wheel suitable for exerting pressure on the tape of impregnated fibers deposited on the deposition surface 2.

Alternatively, the presser means 61 may comprise a smoother 60 having a sharp or rounded edge 62 pressing against the tape 11 of impregnated fibers in order to press it against the deposition surface 2. The smoother is in contact with the tape of impregnated fibers only via a surface of very small area, namely the area of the edge 62.

The deposition head may include a compression actuator 63 suitable for moving the presser means 61. Under such circumstances, the compression actuator 63 may be fastened to the frame 21, while, on the contrary, the presser means 61 are movable relative to the frame. For example, the presser means 61 may be moved in translation substantially vertically, as shown by double-headed arrow F1.

The compression actuator 63 may move the presser means 61 from a position referred to as the "rest" position POS1 to a position referred to as the "compression" position. In the rest position POS1, the presser means 61 cannot press the tape 11 of impregnated fibers against the deposition surface 2. Conversely, in the compression position, the presser means 61 press the tape 11 of impregnated fibers against the deposition surface 2 by exerting smoothing pressure.

The compression actuator 63 thus serves to adjust accurately the pressure exerted by the presser means 61 against the tape 11 of impregnated fibers in the compression position. For example, an operator adjusts the pressure to be applied by using the control means 16, with the control means 16 acting for example to servo control the compression force of the presser means 61 by using sensors, not shown.

In another aspect, the deposition head 20 may include a cutter system 70 for cutting the tape 11 of impregnated fibers. The cutter system 70, if any, is arranged upstream from the presser means 61 relative to the travel direction of the tape of impregnated fibers through the frame 21 of the deposition head 20.

The cutter system 70 may possess a casing 71 that is fastened to the frame 21. Inside the casing 71, the cutter system 70 includes a blade 73 co-operating with an actuator 72. The actuator 72 can move the blade 73 in translation inside the casing in order to direct the blade 73 towards a cutting plane 74. The cutting plane 74 is in the form of a "sacrificial" spacer.

The cutter system 70 can thus cut the tape 11 of impregnated fibers on request from the control means 16 by moving the blade 73 against the cutting plane 74, as shown by double-headed arrow F2.

The cutter system 70 also has an opening 75 enabling the slide 40 to pass through the cutter system 70 so as to approach the deposition surface 2.

Specifically, the slide 40 is movable in translation from a high position PSUP as shown in FIG. 2 to a low position shown in the subsequent figures. In the high position PSUP, the slide is arranged upstream from the cutter system 70 relative to the travel direction of the tape of impregnated fibers through the frame 21 of the deposition head 20. In contrast, in order to go from the high position PSUP to the low position, the slide then passes, where appropriate, through the opening 75 in the cutter system 70.

Optionally, a second intermediate roller 32 is positioned close to the opening 75 in order to guide the backing tape 12 after the slide 40 has moved in translation towards the low position.

In order to move the slide 40 in translation, the deposition head 20 includes a movement actuator 41 connected to the slide 40.

In the example shown diagrammatically in FIG. 2, the movement actuator includes a cavity 43 arranged in the slide and a piston 42 arranged in the cavity.

The piston 42 defines at least one variable-volume chamber inside the cavity 43, or indeed two chambers arranged on either side of the piston 42. When the pressure inside at least one chamber is changed by using a hydraulic or pneumatic system, the slide moves relative to the piston 42.

The piston 42 is carried by the frame 21 and thus supports the slide 40. Furthermore, the piston 42 guides the movement in translation of the slide 40.

In another aspect, the slide 40 may also be movable in pivoting about a disengagement axis AX3. This disengagement axis AX3 is parallel to the axis of rotation AX1 of the peeling roller 51.

Under such circumstances, an actuator 80 referred to as the "disengagement" actuator is connected to the slide 40 in order to cause the slide 40 to pivot about the disengagement axis AX3.

For example, the slide 40 and the piston 42 turn about an axis of symmetry of the piston, the piston being hinged to the frame 21.

In another variant, the system includes the piston 42 that is arranged in the cavity 43 for carrying the slide and guiding movement in translation of the slide. Any type of actuator capable of moving the slide, at least in translation, may be used in addition. For example, the movement actuator may comprise an electrical, hydraulic, or pneumatic actuator, e.g. having a rod connected to the slide, with the movement actuator moving the rod in translation or in rotation relative to the frame 21.

The piston 42 of the cavity 43 may form a ball-bearing runner mounted on a pivot arranged about the disengagement axis AX3.

The movement actuator then also constitutes a disengagement actuator 80 arranged to move the slide both in translation and in pivoting.

In another aspect, said slide 40 may carry a clamp 45. The clamp 45 is movable relative to the slide 40.

For example, the clamp 45 is movable in rotation. Under such circumstances, the clamp 45 is hinged to the slide via a pivot hinge 46. In particular, the clamp 45 may be movable in pivoting about an axis referred to as the "clamping" axis AX2, which is parallel to the axis of rotation AX1 of the peeling roller 51.

For example, the clamp 45 comprises a first arm 48 hinged to the pivot hinge 46 and a second arm 49 secured to the first arm 48. The second arm 49 is then situated facing the bearing face 400 of the slide 40. More precisely, the clamp 45, and for example the second arm 49, presents a clamping surface 490 that is substantially parallel to the bearing surface 400 of the slide 40 in a clamping position POSF, as shown in FIG. 2.

Also, the placement head 20 includes a clamping actuator 47. The clamping actuator 47 extends between the slide 40 and the clamp 45, e.g. between the slide 40 and the first arm 48. A clamping actuator 47 is configured to move the clamp 45 from the clamping position POSF towards a release position POS0. In the clamping position POSF, the clamp 45 constrains the tape 11 of impregnated fibers to move in translation with the slide 40 by pinching a segment of the assemblage 13 of tapes between its clamping surface 490 and the bearing surface 400 of the slide. In contrast, in the release position POS0, the clamp 45 does not constrain the assemblage 13 of tapes to move in translation with the slide 40.

In another variant, the clamp 45 is movable in translation, being driven by an actuator and an appropriate linkage.

FIGS. 2 to 7 show the operation of the deposition head.

Before beginning a sequence of depositing a tape 11 of impregnated fibers that is programmed in the control means 16, the slide 40 is in its high position PSUP or in its intermediate position. Where appropriate, the clamp 45 is moved into its clamping position POSF. The presser means 61 are in the rest position POS1, and the blade 73 of the cutter system 70 is raised.

In order to advance the deposition head, the movement actuator 41 moves the slide 40 downwards in translation. The movement of the assemblage 13 of tapes together with the slide 40 is facilitated by the clamp 45 holding this assemblage 13 to the slide 40.

Under such circumstances, the deposition is moved towards the deposition surface by moving downwards in elevation.

Figure 3:
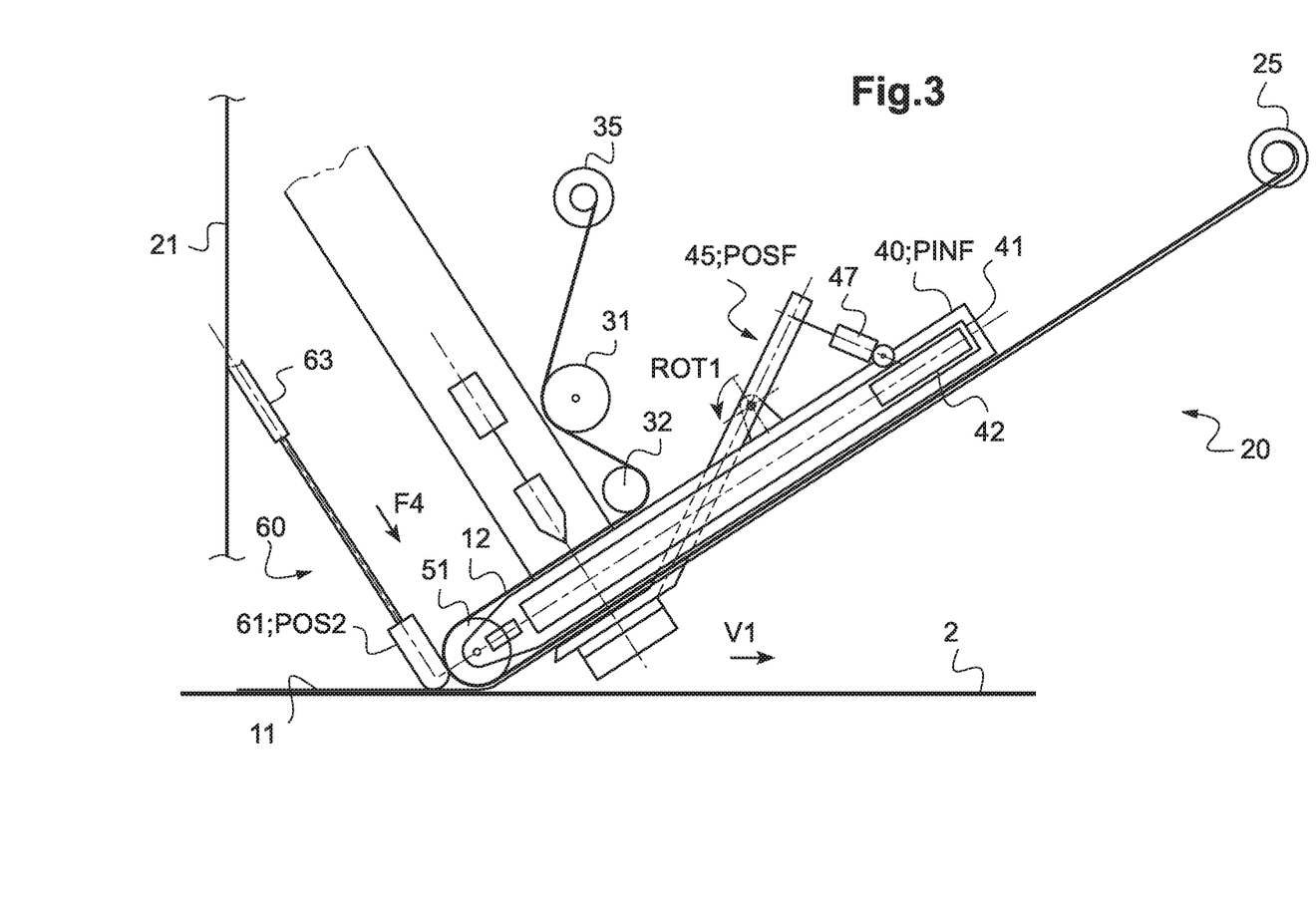
FIGS. 3 to 7 are diagrams for explaining the operation of the invention.

With reference to FIG. 3, the slide then passes through the cutter system 70 in order to reach its low position PINF. The tape 11 of impregnated fibers includes a segment 110 that rests on the deposition surface. This segment 110 is held against the deposition surface by the peeling roller 51.

Furthermore, the backing tape then passes against the second intermediate roller 32. This second intermediate roller avoids unwanted contact between the cutter system and the backing tape 12 downstream from the peeling roller. The tape 11 of impregnated fibers is passing on a line which is tangent to the second intermediate roller 32 and to the peeling roller, said line passing through the cutter system 70 in the low position of the slide.

Where appropriate, and on order from the control means 16, the compression actuator 63 moves the presser means 61 in translation into the compression position POS2 along arrow F4 in order to press against this segment 110.

Furthermore, the clamping actuator 47 causes the clamp 45 to perform a pivot movement in rotation ROT1 in order to position the clamp 45 in its release position POS0.

Furthermore, the backing tape 12 goes to the recovery spool 35 by passing in succession about the peeling roller 51, the second intermediate roller 32, and then the first intermediate roller 31.

Under such circumstances, the deposition head 20 is moved by the movement system on order from the control means 16 at a first speed V1. The assemblage 13 of tapes is unwound from the feed spool 25 and the tape of impregnated fibers is spread against the deposition surface.

Figure 4:
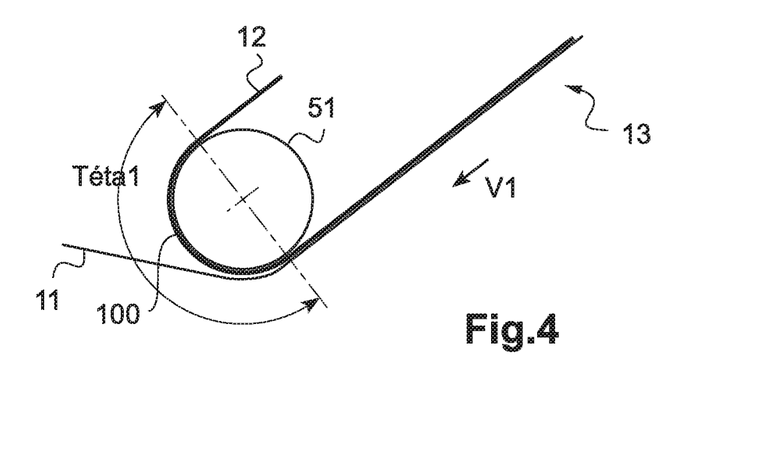

With reference to FIG. 4, when the slide 40 is in its low position PINF, the backing tape 12 is spread against the peeling roller 51 over a circular arc 100 that occupies a first angle teta1. This first angle teta1 is of the order of 180 degrees (°).

Under such circumstances, the first speed V1 is small.

Once the deposition head 20 has traveled a distance that is pre-programmed in the control means 16, the control means cause the deposition head 20 to be held stationary prior to beginning a stage of fast movement.

Figure 5:
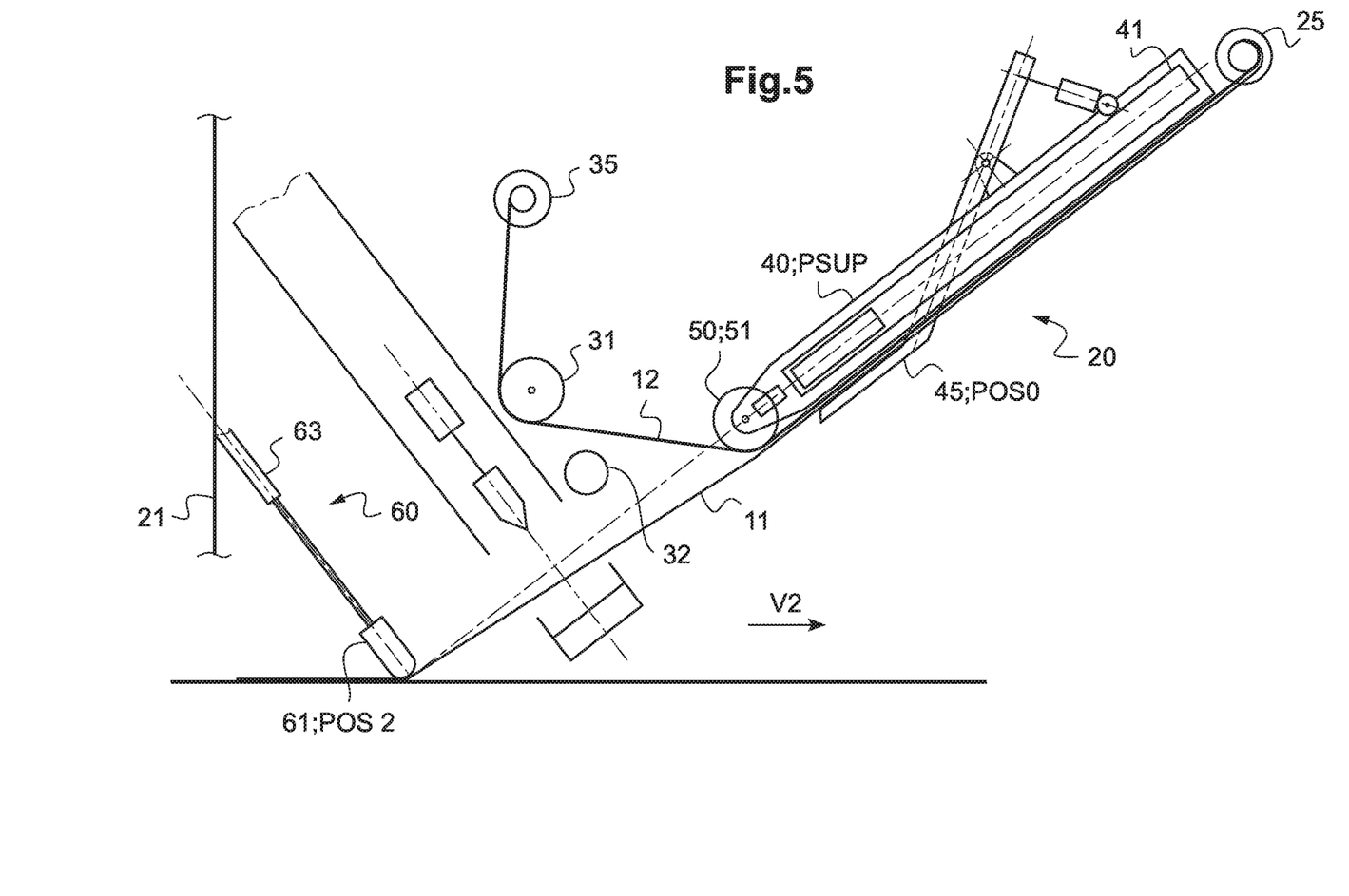

With reference to FIG. 5, the control means 16 cause the movement actuator 41 to move the slide 40 in translation towards its high position PSUP. Where appropriate, the control means 16 cause the disengagement actuator 80 to move the slide 40 in pivoting about the disengagement axis AX3 so as to move the peeling roller 51 towards the recovery spool 35.

Figure 6:
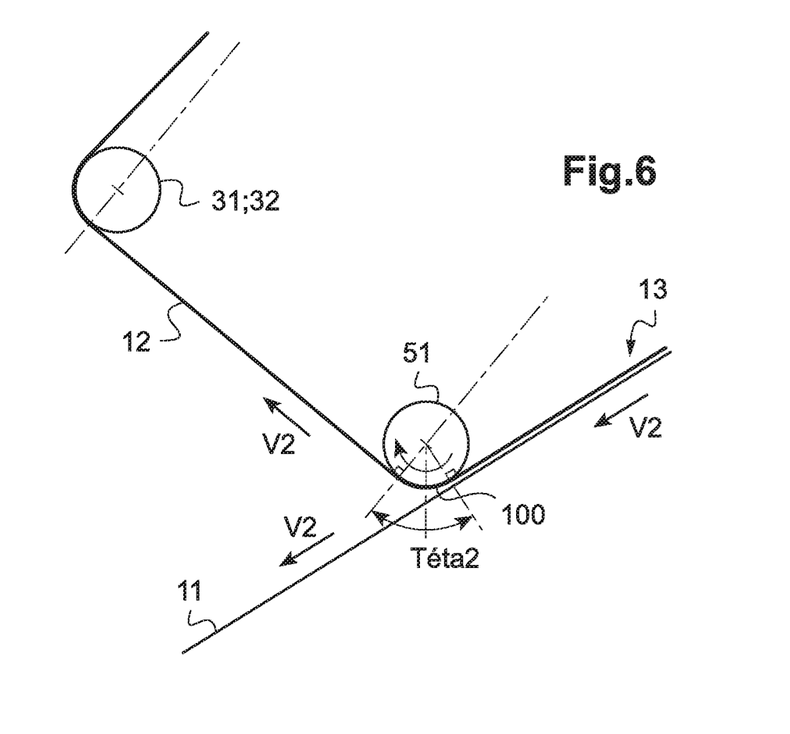

With reference to FIG. 6, when the slide 40 is in its high position PSUP, the backing tape 12 is spread against the peeling roller 51 over a circular arc 100 that occupies a second angle teta2. This second angle teta2 is less than the first angle teta1.

By way of example, the second angle teta2 is equal to 60°±5°. Such a second angle teta2 enables the backing tape 12 to be peeled off correctly.

Under such circumstances, the deposition head 20 can be moved at a high second speed V2 by the movement system.

Figure 7:
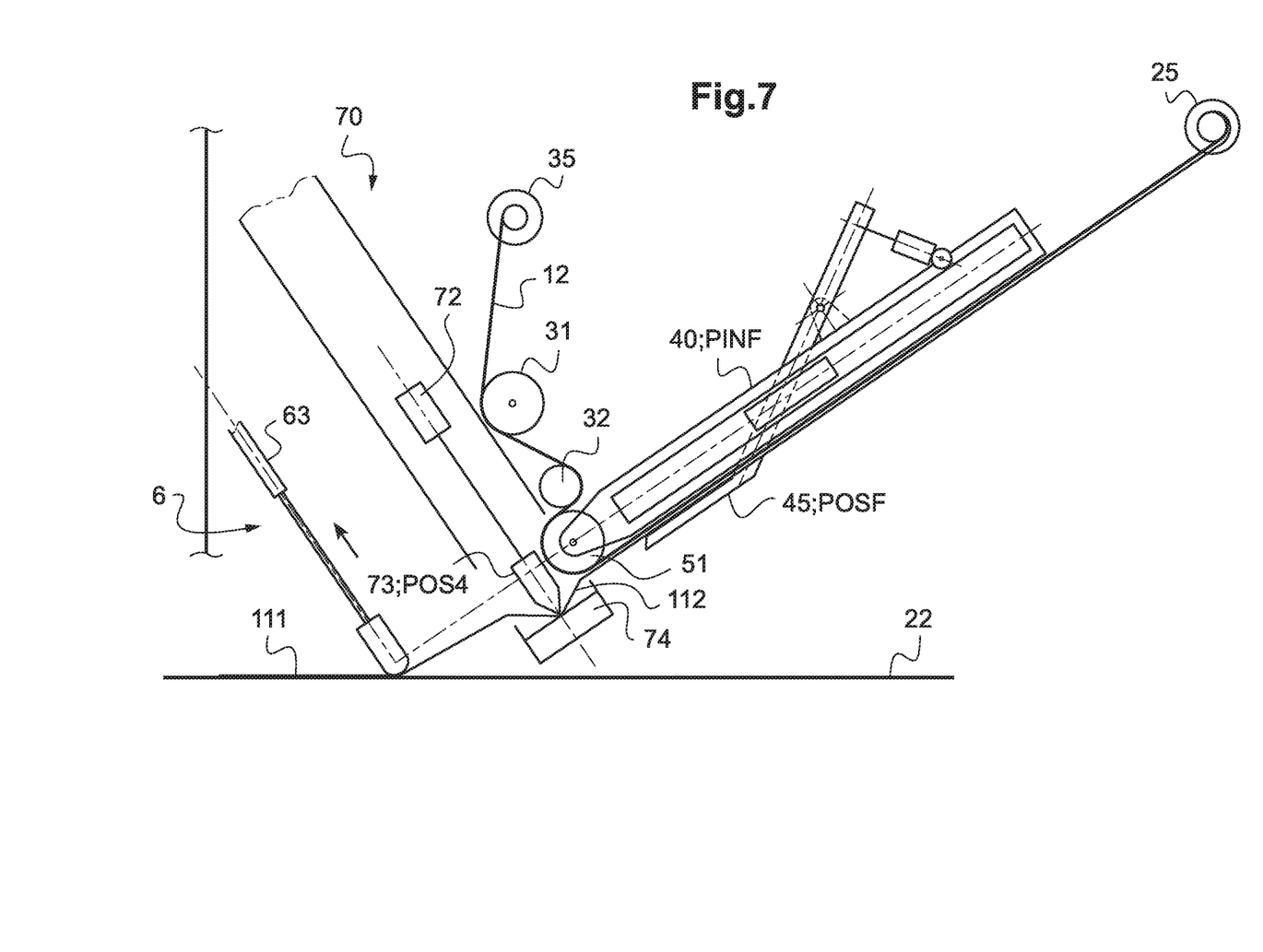

At the end of the deposition sequence, and with reference to FIG. 7, the control means 16, order where appropriate, the disengagement actuator 80 to move the slide 40 in pivoting about the disengagement axis AX3 in order to return the slide 40 into its previous position, aligning the slide with the opening 75 in the cutter system 70.

Also, the control means 16 may order the movement actuator to move the slide 40 in translation towards its intermediate position PINT.

Furthermore, the control means 16 can order the clamping actuator 47 to cause the clamp 45 to turn in order to position the clamp 45 in its clamping position POSF.

The cutter system 70 is then operated by the control means 16. The blade 73 moves in translation to cut the tape 11 of impregnated fibers. A first cut end 111 of the tape of impregnated fibers is then released from the slide. A second cut end 112 of the tape of impregnated fibers projects from the peeling roller 51.

The deposition head 20 is optionally moved in translation so that the press means 61 press the first cut end 111 of the tape of impregnated fibers against the deposition surface 2.

The control means 16 may order the compression actuator 63 to raise the presser means into the rest position POS1. Furthermore, the movement actuator may return the slide 40 into its high position PSUP.

The deposition head may then be moved in order to initiate a new deposition sequence.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A deposition head for depositing a tape of impregnated fibers, the deposition head being configured to receive an assemblage comprising the tape of impregnated fibers arranged on a backing tape, the deposition head including a recovery spool for recovering the backing tape and parting means for parting the tape of impregnated fibers from the backing tape, wherein the deposition head includes a slide and a movement actuator connected to the slide to move the slide in translation from a high position to a low position, the slide carrying a peeling roller of the parting means, the backing tape extendable over a circular arc against the peeling roller in order to reach the recovery spool, the low position being configured so that the peeling roller presses the tape of impregnated fibers against a deposition surface only in the low position of the slide, the circular arc occupying a first angle in the low position of the slide and a second angle in the high position of the slide, the first angle being greater than the second angle;

wherein the deposition head includes presser means arranged, in the low position of the slide, upstream from the peeling roller relative to the travel direction of the deposition head while depositing the tape of impregnated fibers on the deposition surface; and wherein the presser means are connected to a compression actuator to be movable between a rest position and a compression position, the rest position being configured so that the presser means do not press the tape of impregnated fibers against the deposition surface, the compression position being configured so that the presser means press the tape of impregnated fibers against the deposition surface.

2. The deposition head according to claim 1, wherein the parting means include at least one intermediate roller arranged between the peeling roller and the recovery spool relative to the path followed by the backing tape going towards the recovery spool.

3. The deposition head according to claim 2, wherein the at least one intermediate roller comprises a first intermediate roller and a second intermediate roller, the first intermediate roller being arranged between the second intermediate roller and the recovery spool, the second intermediate roller leading to an opening in a cutter system, the second intermediate roller configured to avoid the backing tape coming into destructive contact with the cutter system when the slide is in the low position.

4. The deposition head according to claim 1, wherein the peeling roller is arranged at one end of the slide.

5. The deposition head according to claim 1, wherein the slide carries a clamp that is movable relative to the slide, a clamping actuator being connected to the clamp to move the clamp from a clamping position to a release position, the clamp in the clamping position configured to constrain the tape of impregnated fibers to move in translation with the slide, the clamp in the release position configured to not constrain the tape of impregnated fibers to move in translation with the slide.

6. The deposition head according to claim 5, wherein the clamp includes a clamping surface parallel to a bearing surface of the slide in the clamping position.

7. The deposition head according to claim 5, wherein the clamp is movable in pivoting about a clamping axis parallel to an axis of rotation of the peeling roller.

8. The deposition head according to claim 1, wherein the slide is movable in pivoting about a disengagement axis parallel to an axis of rotation of the peeling roller.

9. The deposition head according to claim 1, wherein the slide carries a heater system.

10. The deposition head according to claim 1, wherein the deposition head includes a cutter system configured to cut the tape of impregnated fibers, the cutter system including an opening through which the peeling roller passes during the movement of the slide between the low position and the high position.

11. The deposition head according to claim 1, wherein the second angle is less than or equal to 60°±5°.

12. A placement device for placing a tape of impregnated fibers, the device being provided with a deposition head, a movement system, and control means for controlling the movement system and the deposition head, and wherein the deposition head is according to claim 1.

13. A placement method for placing a tape of impregnated fibers by means of a placement device according to claim 12, wherein the method comprises the following steps:

approaching the deposition head by moving the slide into the low position in order to present at the tape of impregnated fibers against the deposition surface of the peeling roller;

moving the deposition head at a first speed;

stopping the deposition head;

moving the slide into the high position; and moving the deposition head at a second speed greater than the first speed, wherein prior to moving the deposition head, the method includes a step of moving the presser means pressing the tape of impregnated fibers against the deposition surface.

14. The placement method according to claim 13, wherein the step of approaching the deposition head comprises the following steps:

holding the tape of impregnated fibers against moving in translation relative to the slide;

moving the slide into the low position; and parting the tape of impregnated fibers to move in translation relative to the slide.

15. A deposition head for depositing a tape of impregnated fibers, the deposition head being configured to receive an assemblage comprising the tape of impregnated fibers arranged on a backing tape, the deposition head including a recovery spool for recovering the backing tape and parting means for parting the tape of impregnated fibers from the backing tape, wherein the deposition head includes a slide and a movement actuator connected to the slide to move the slide in translation from a high position to a low position, the slide carrying a peeling roller of the parting means, the backing tape extendable over a circular arc against the peeling roller in order to reach the recovery spool, the low position being configured so that the peeling roller presses the tape of impregnated fibers against a deposition surface only in the low position of the slide, the circular arc occupying a first angle in the low position of the slide and a second angle in the high position of the slide, the first angle being greater than the second angle;

wherein the parting means include at least one intermediate roller arranged between the peeling roller and the recovery spool relative to the path followed by the backing tape going towards the recovery spool; and wherein the at least one intermediate roller comprises a first intermediate roller and a second intermediate roller, the first intermediate roller being arranged between the second intermediate roller and the recovery spool, the second intermediate roller leading to an opening in a cutter system, the second intermediate roller configured to avoid the backing tape coming into destructive contact with the cutter system when the slide is in the low position.

16. A deposition head for depositing a tape of impregnated fibers, the deposition head being configured to receive an assemblage comprising the tape of impregnated fibers arranged on a backing tape, the deposition head including a recovery spool for recovering the backing tape and parting means for parting the tape of impregnated fibers from the backing tape, wherein the deposition head includes a slide and a movement actuator connected to the slide to move the slide in translation from a high position to a low position, the slide carrying a peeling roller of the parting means, the backing tape extendable over a circular arc against the peeling roller in order to reach the recovery spool, the low position being configured so that the peeling roller presses the tape of impregnated fibers against a deposition surface only in the low position of the slide, the circular arc occupying a first angle in the low position of the slide and a second angle in the high position of the slide, the first angle being greater than the second angle; and     wherein the slide carries a clamp that is movable relative to the slide, a clamping actuator being connected to the clamp to move the clamp from a clamping position to a release position, the clamp in the clamping position configured to constrain the tape of impregnated fibers to move in translation with the slide, the clamp in the release position configured to not constrain the tape of impregnated fibers to move in translation with the slide.

17. The deposition head according to claim 16, wherein the clamp includes a clamping surface parallel to a bearing surface of the slide in the clamping position.

18. The deposition head according to claim 16, wherein the clamp is movable in pivoting about a clamping axis parallel to an axis of rotation of the peeling roller.

19. A deposition head for depositing a tape of impregnated fibers, the deposition head being configured to receive an assemblage comprising the tape of impregnated fibers arranged on a backing tape, the deposition head including a recovery spool for recovering the backing tape and parting means for parting the tape of impregnated fibers from the backing tape, wherein the deposition head includes a slide and a movement actuator connected to the slide to move the slide in translation from a high position to a low position, the slide carrying a peeling roller of the parting means, the backing tape extendable over a circular arc against the peeling roller in order to reach the recovery spool, the low position being configured so that the peeling roller presses the tape of impregnated fibers against a deposition surface only in the low position of the slide, the circular arc occupying a first angle in the low position of the slide and a second angle in the high position of the slide, the first angle being greater than the second angle; and     wherein the deposition head includes a cutter system configured to cut the tape of impregnated fibers, the cutter system including an opening through which the peeling roller passes during the movement of the slide between the low position and the high position.

20. The deposition head according to claim 19, wherein the parting means include at least one intermediate roller arranged between the peeling roller and the recovery spool relative to the path followed by the backing tape going towards the recovery spool.

\* \* \* \* \*